Feb. 16, 1926.                    L. J. HAND ET AL                    1,572,924
                                PIPE END FORMING TOOL
                                 Filed Oct. 14, 1924
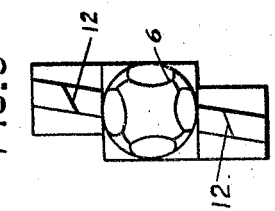
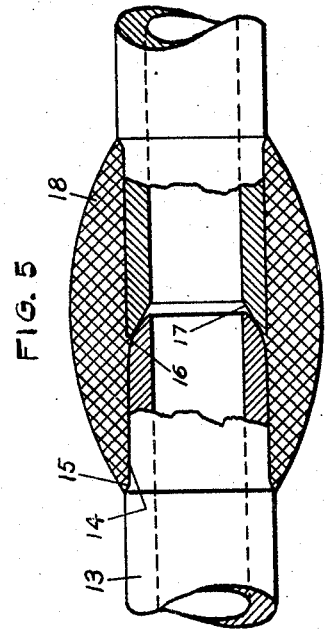
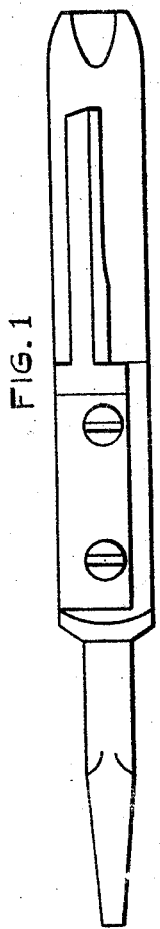
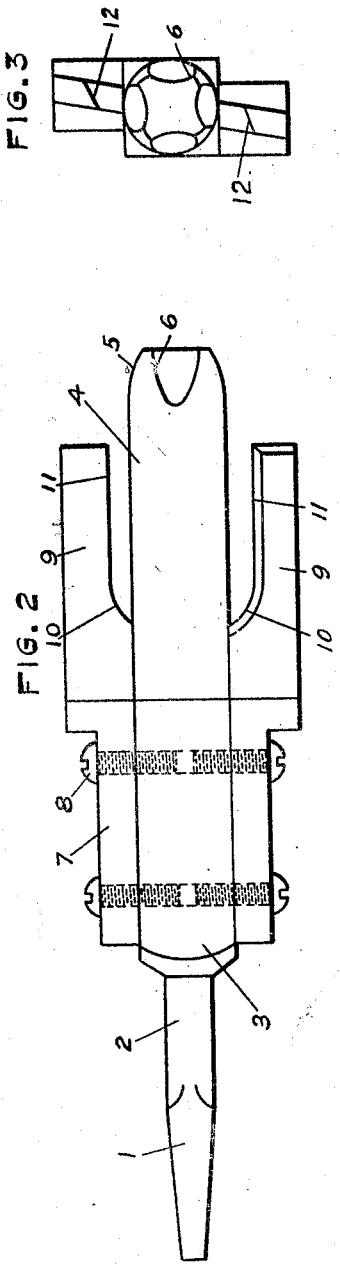
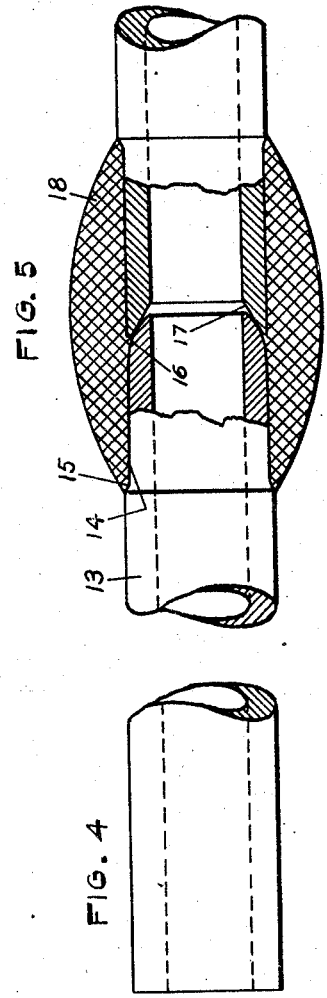
INVENTORS
LAWRENCE J. HAND
HENRY G. PASSE
BY *Toulmin & Toulmin*
ATTORNEYS Patented Feb. 16, 1926.

1,572,924

UNITED STATES PATENT OFFICE.

LAWRENCE J. HAND AND HENRY G. PASSÉ, OF DAYTON, OHIO.

PIPE-END-FORMING TOOL.

Application filed October 14, 1924. Serial No. 743,637.

*To all whom it may concern:*

Be it known that we, LAWRENCE J. HAND and HENRY G. PASSÉ, citizens of the United States, residing at Dayton, in the county of Montgomery and State of Ohio, have invented certain new and useful Improvements in Pipe-End-Forming Tools, of which the following is a specification, reference being had therein to the accompanying drawing.

Our invention relates to a means and method of forming a joint in pipes.

It is the object of our invention to provide a rapid and efficient means of forming the end of a pipe, particularly a lead pipe, so that it may be rapidly and positively joined to another section of pipe.

It is a further object to provide the head of the pipe so that the material applied to cement the joint may be uniformly arranged between the shoulders on the pipe to insure a perfect joint.

Heretofore such work has been done by hand by filing the pipe with a heavy file to form a tapered head on the end of the pipe, but this is not only expensive, tiresome and slow, but inaccurate. It results in an insufficient taper being given to the pipe due to the failure of the maker of the joint to provide sufficient shoulder on the pipe so that the cementing agent will have a bearing surface of sufficient area to insure a perfect joint. Unless such shoulders and bearing surface are provided when the ground in which the pipes are embedded sinks, the pipe will break at the joint.

It is an object of our invention to provide a readily portable tool which may be either operated by hand, by a brace and may be substituted for an ordinary tool or it may be mounted in a machine tool.

It is a further object of our invention to provide a tool in which the cutting members may be readily detached for the substitution of new members or for the sharpening of old members.

It is an additional object to provide a reamer in combination with the tool to prevent the accumulation of chips and to insure a perfect interior of the pipe. The reamer also has an additional function of acting as a support or mandrel so that the pipe will be in proper position with respect to the cutting elements.

The detachable feature of the cutting elements has the additional advantage of permitting different shaped cutting elements to be applied for different sizes of pipes to give different configurations to the ends of the pipes.

It is an additional advantage of our invention that instead of the lead which is removed from the pipe being in the form of a fine dust, by our method and machine the lead is removed in large chips so that the chips can be readily gathered up and salvaged, which is a great economy where a large number of these joints are being made.

Referring to the drawings, Figure 1 is a plan view of the tool;

Figure 2 is a side elevation of the tool;

Figure 3 is a front elevation of the tool;

Figure 4 is a section of the pipe which is to be worked upon; and

Figure 5 is a view of the pipe with the ends completed and joined together with the joining agent in section.

Referring to the drawings in detail, 1 is the tapered shank which fits into the jaws of the brace. This shank is formed like an ordinary bit shank. 2 is the shaft of the tool upon which is mounted a square tool supporting head 3. This tool supporting head has its outer portion of cylindrical form adapted to fit within the interior of the pipe. This mandrel portion 4 has a tapered end 5 with cutting edges 6 thereon. This constitutes a reamer for trimming the interior of the pipe particularly at the mouth of the pipe where a rough edge is to be expected where the pipe has been severed from the main portion of the pipe, as such lead pipes come in coils of predetermined length.

On the tool supporting head are the cutting tools which consist of a supporting base 7 attached by the bolts 8 to the tool supporting head. This base 7 carries the cutter 9 which has a curved cutting edge 10 and a straight cutting edge 11 spaced from the mandrel 4. The pipe wall is slipped over the mandrel beneath the cutter so that it is between the cutter and the mandrel, thus insuring that the pipe is in proper position and will have the exact amount of lead trimmed from the end thereof. This cutting tool is tilted bodily at an angle to the vertical. The cutting surface is tapered upwardly as at 12 so that the lead shavings may freely pass away from the tool. It is this arrangement which also results in the lead being cut from the pipe being in the form of shavings which can be salvaged.

It will be observed that the pipe designated 13 is the usual cylindrical member and as a result of this operation it acquires a head which is of lesser outside diameter as at 14. Between the surface 13 and the surface 14 is formed a tapered shoulder 15. The head of the pipe is tapered as at 16 until the outer wall meets the inner wall at 17. The white lead joint 18 thus is provided with a uniform broad bearing support engaging with the shoulders 16 and 15 to prevent shifting and to brace the head 18.

It will be understood that we desire to comprehend within our invention such modifications as may be necessary to adapt it to varying conditions of use.

Having thus fully described our invention, what we claim as new and desire to secure by Letters Patent, is:—

A tool comprising a rectangular head provided with a shank adapted to be received in a rotary tool holder, a reamer forming a continuation of the head, substantially L-shaped cutters disposed at diametrically opposite points of the reamer, and an attaching element carried by the shorter legs, an attaching element formed with the shorter leg of each of the L-shaped cutters and having their end faces flattened throughout their lengths and contacting with the head, fastenings detachably connecting the attaching elements with the head, the cutters being provided with continuous cutting edges, the major part of the length of such cutting edges being spaced from the reamer and their inner ends extended to the latter.

In testimony whereof we affix our signatures.

LAWRENCE J. HAND.
HENRY G. PASSÉ.